(12) United States Patent
Nguyen et al.

(10) Patent No.: US 6,246,057 B1
(45) Date of Patent: Jun. 12, 2001

(54) TRANSMISSION ATTENUATION CORRECTION DEVICE FOR SCINTIGRAPHY CAMERAS

(75) Inventors: Trung Nguyen, Le Plessis Robinson; Jean Treillet, Boulogne Billancourt; Jean-Claude Geay, Montigny le Bretonneux; François Roche, Boulogne, all of (FR)

(73) Assignee: SMV International, Buc (FR)

( * ) Notice: Subject to any disclaimer, the term of this patent is extended or adjusted under 35 U.S.C. 154(b) by 0 days.

(21) Appl. No.: 09/227,891

(22) Filed: Jan. 11, 1999

(30) Foreign Application Priority Data

Jan. 16, 1998 (FR) .................................................. 98 00449

(51) Int. Cl.$^7$ ............................... G01T 1/166; G21K 5/00
(52) U.S. Cl. ...................................................... 250/363.04
(58) Field of Search ......................................... 250/363.04

(56) References Cited

U.S. PATENT DOCUMENTS 5,576,545   11/1996  Stoub et al. .
5,596,197   1/1997   Jones et al. .
5,598,003   1/1997   Jones et al. .
5,834,780 * 11/1998  Morgan et al. ................ 250/363.04

FOREIGN PATENT DOCUMENTS 0 654 682   5/1995   (EP) .

* cited by examiner

Primary Examiner—Constantine Hannaher
(74) Attorney, Agent, or Firm—Connolly Bove Lodge & Hutz LLP

(57) ABSTRACT

Transmission attenuation correction device for scintigraphic cameras that contain a source of gamma rays that sweep the active surface of a detector facing it through the body of the patient in order to measure the attenuation of the photon energy through this body and therefore allow for the correction of the attenuation of the photon energy emitted by the radiated organ. The radioactive source (30) is inserted in a rod (29) located in a removable cassette (21), this rod can automatically isolate the source (30) when the cassette (21) is not in its support. Each device is contained in a box attached to the detector other than the one facing it. The rod (29) that contains the source has different realization forms that make it possible to include materials that each have their own attenuation coefficient.

12 Claims, 5 Drawing Sheets

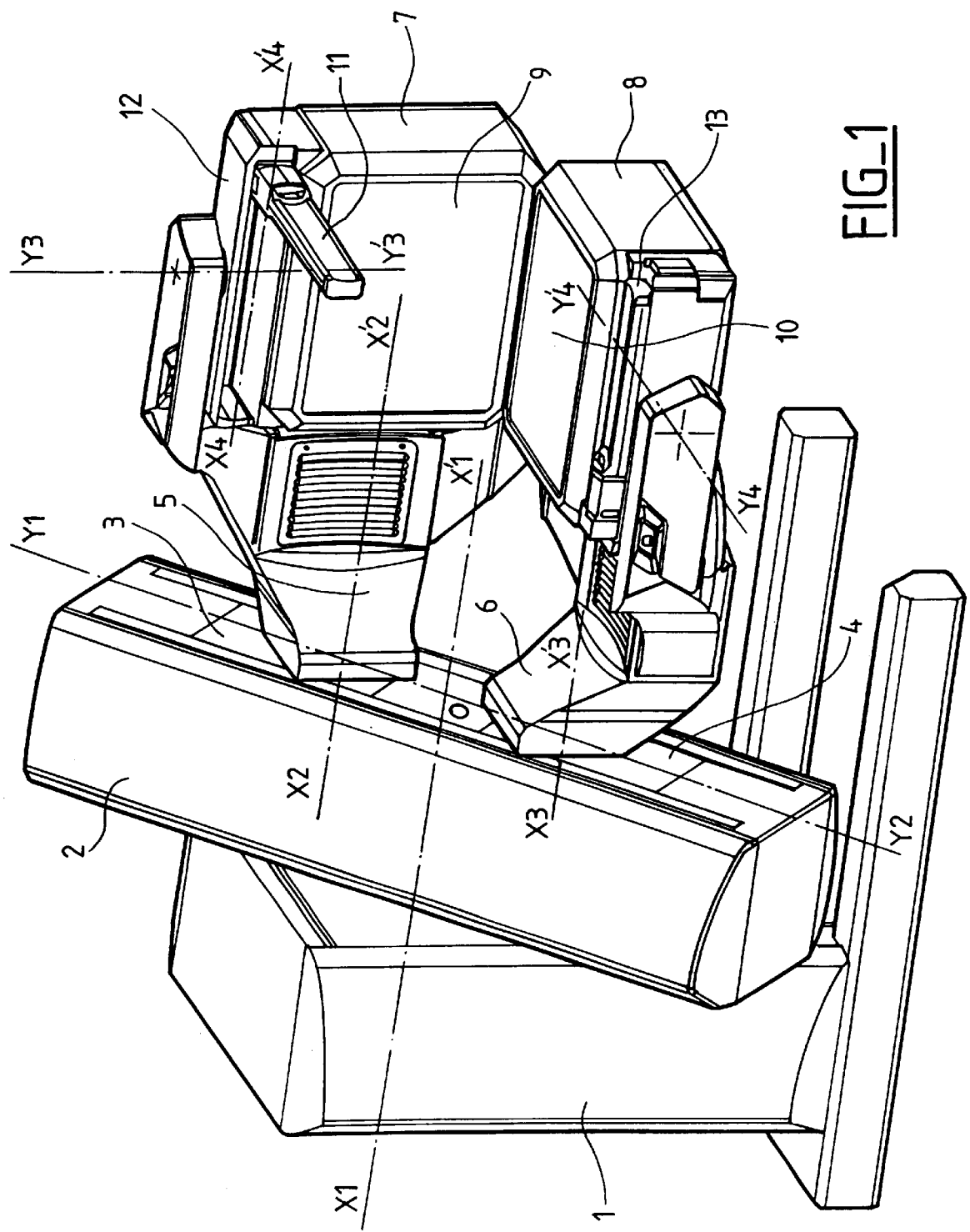

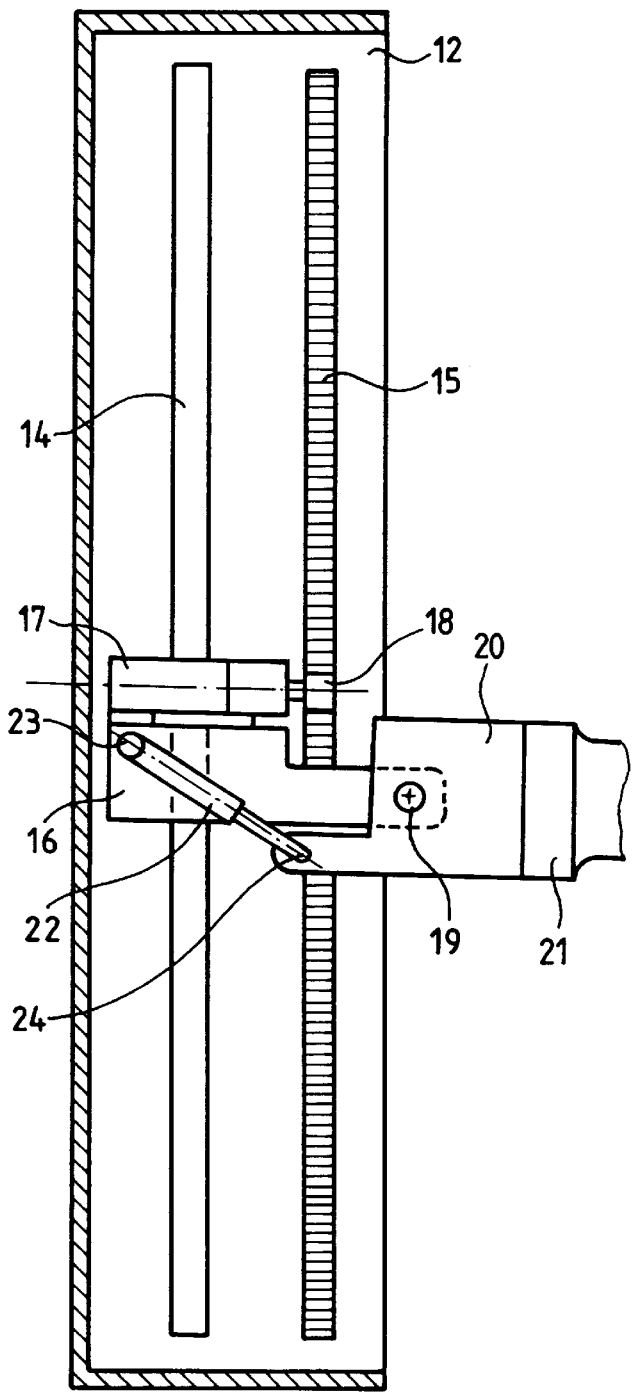
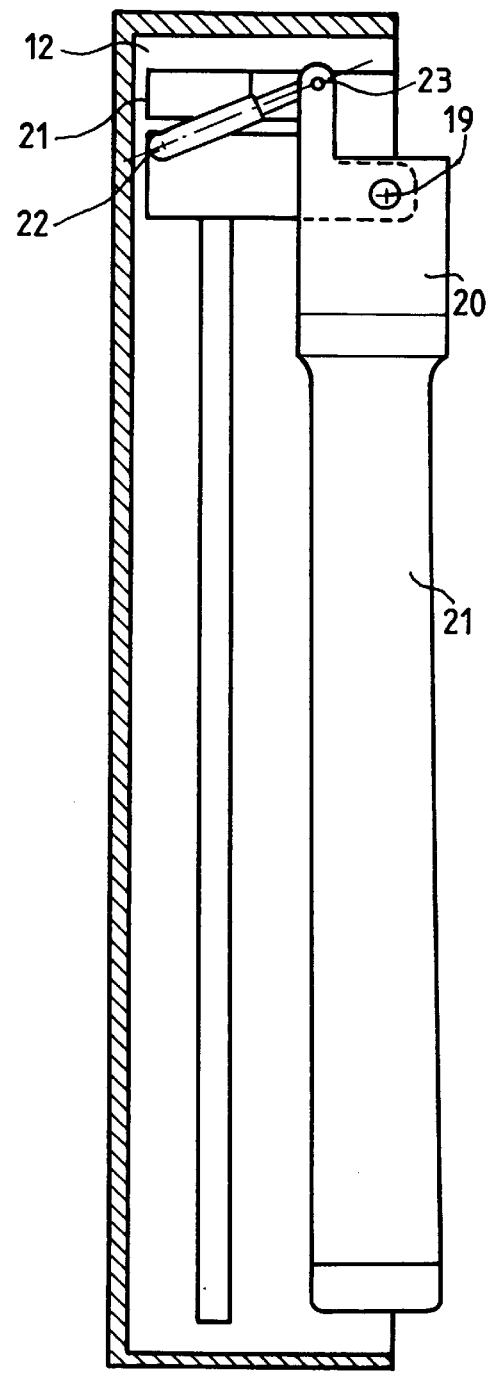
FIG_2    FIG_3

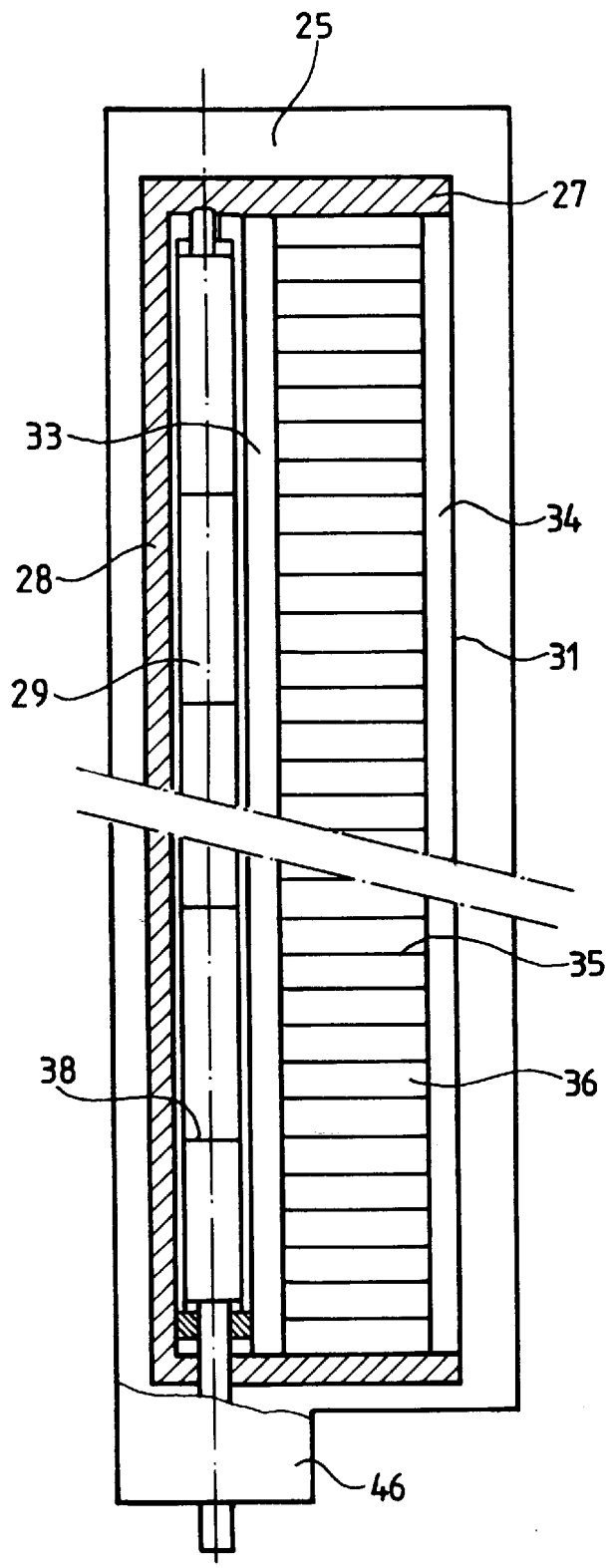
FIG_4
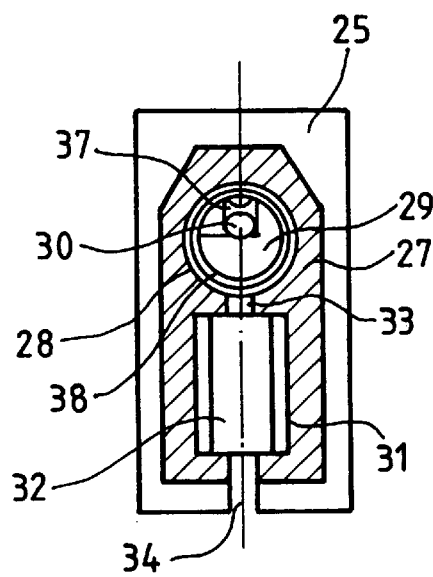
FIG_5
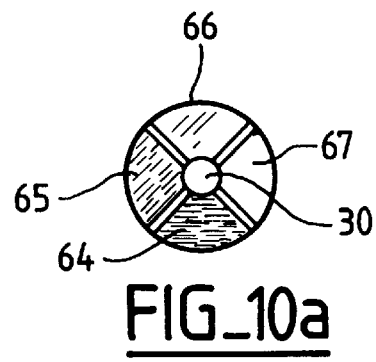
FIG_10a
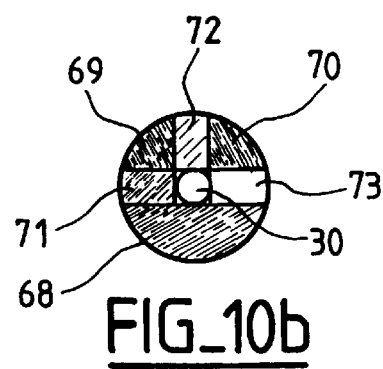
FIG_10b

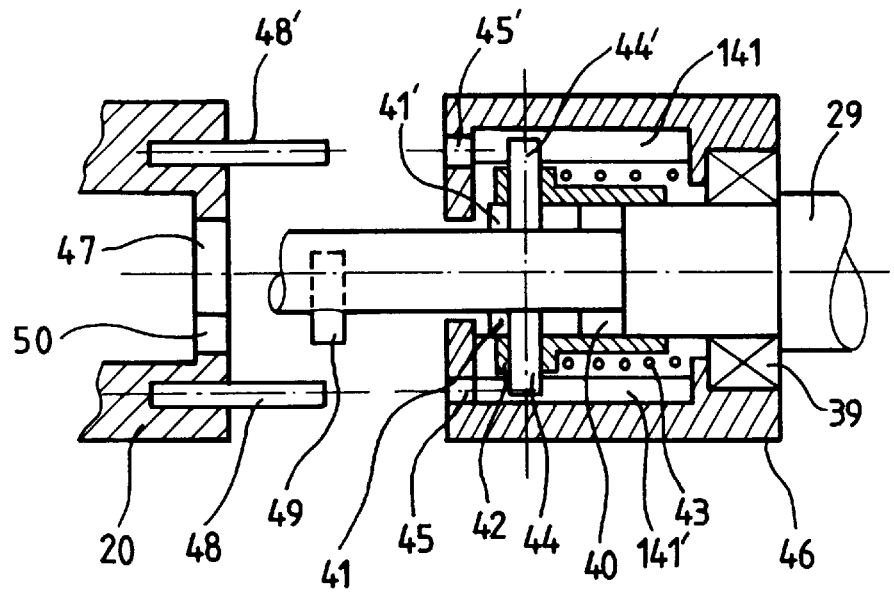
FIG_6
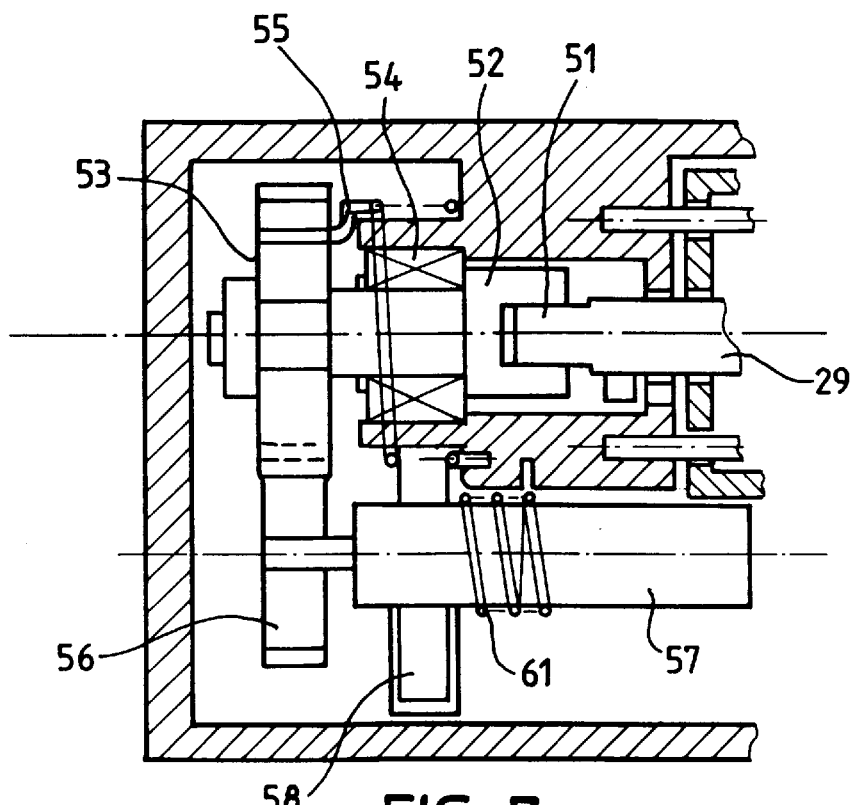
FIG_7

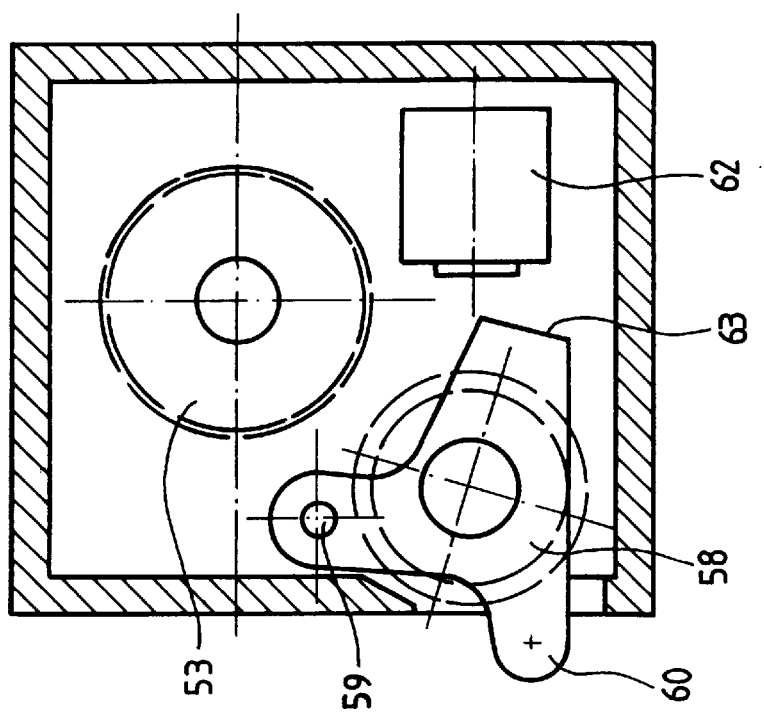
FIG_9
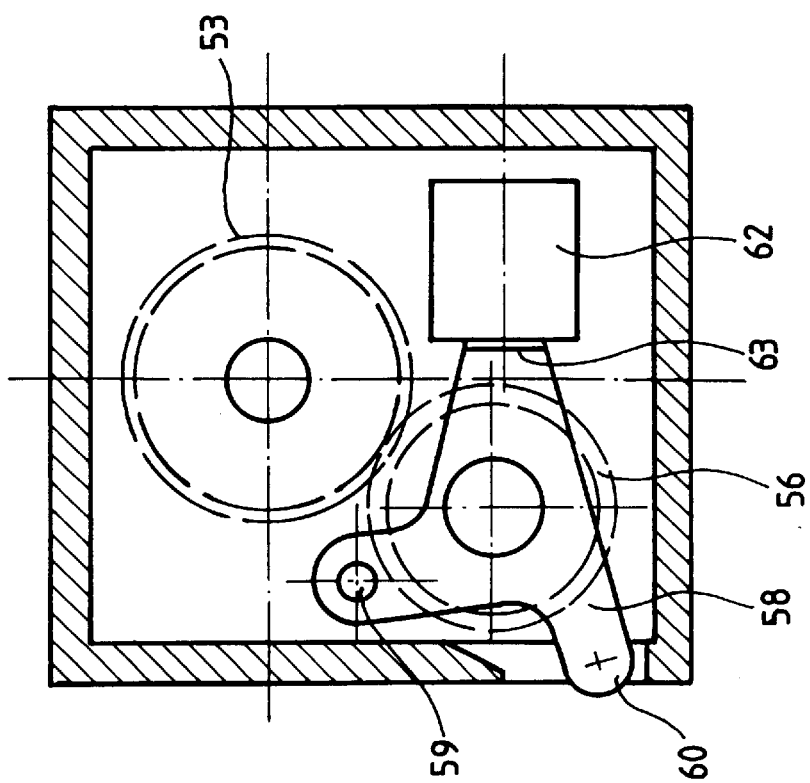
FIG_8

TRANSMISSION ATTENUATION CORRECTION DEVICE FOR SCINTIGRAPHY CAMERAS

FIELD OF THE INVENTION

This invention falls in the field of nuclear medicine that uses scintigraphic cameras, also called gamma cameras, to obtain very detailed images of a patient's organs. Scintigraphy is the clinical data obtained by observing the distribution of a radioactive substance administered to the patient. The observation of this distribution (utilizing an Anger camera) results in the creation of images of the organ being examined.

BACKGROUND OF THE INVENTION

On dual detector cameras, the acquisition can take place either by tomography with perpendicular or parallel detectors that revolve around the organ, or by translation of the detectors facing each other on either side of the patient's body.

The non uniformity of the attenuation due to variable attenuation coefficients, depending on the type of tissue (bone, breast, lung, muscle, . . . ) causes artifacts which alter the precision of the emission images. The conventional attenuation correction procedures are inappropriate because they presume a constant distribution of the attenuation coefficients. An acquisition by transmission, using an external radioactive source, allows for the calculation of a table of attenuation coefficients that are specific to the patient, a table that will be used to correct this emission of images. This process allows for a Transmission Attenuation Correction, better known as "TAC".

The correction system used to implement this TAC process consists of a radioactive source that emits gamma rays of known energy that sweep the active surface of the detector through the patient's body. The attenuation of energy caused by the patient's body is measured in this detector. The result of this measuring, appropriately treated, provides data that allows for the correction of the attenuation of photon energy emitted by the irradiated organ and therefore, for the acquisition of a more precise image.

The TAC system radioactive source is a linear rod whose radiation is transmitted in the direction of the detector through a collimator; it moves parallel to itself in a plane that is parallel to the detector's surface of detection.

Over time, this radioactive source progressively loses its radiation power whereas the energy received by the detector must remain approximately constant in time. Therefore, between the source and the collimator, we have an attenuator that belongs to a series whose efficiencies are decreasing. On the other hand, when the source no longer emits rays, it must be replaced.

As it now stands in the technique, the replacement of the attenuator and of the source are delicate operations that must be performed on site with great care by specialized personnel in order not to be subject to a prolonged and therefore dangerous radiation.

The current technique represented in particular in the U.S. Pat. Nos. 5,596,197 and 5,598,003 which refer to the sweeping direction in very specific conditions does not address the problems brought up.

BRIEF DESCRIPTION OF THE INVENTION

This invention solves these inconveniences by securing the exchange of the source and the attenuators of the TAC system.

As set forth in the invention, the Transmission Attenuation Correction for scintigraphic cameras consists of a carriage that is mobile in translation, where this carriage is fitted with an articulation for a support that can fold into a box or unfold perpendicularly, characterized by the fact that it holds a removable cassette that contains a radioactive source.

In the cassette, the radioactive source is inserted in the longitudinal groove of a cylindrical rod made of material that isolates gamma rays; by rotating the rod, this groove can be placed either in front of the isolating wall, or in front of the radiation's outlet channel.

The rotation of the rod is controlled by a motorized mechanism that consists of a driving pinion integral with the motor and a driven pinion linked to the rod by a sliding assembly.

The two pinions are held apart by a first spring and the meshing, caused by a manual pulse, is maintained by an electrical part, such as an electromagnet, so that in the absence of current, the pinions are inevitably separated.

A second spring brings the rod back into the source isolation position.

When the cassette is mounted on its support, a mechanical system that immobilizes the rod in the isolation position is activated in order to authorize its rotation.

The extremity of the rod is shaped like a key that can only enter, or exit, the hole in the support if said rod is in the isolation position in the cassette.

On the double head open stand scintographic cameras, the TAC devices are included in boxes that are attached to the detectors; when unfolded, each TAC device acts on the detector facing it.

The rod consists of sectors with different attenuation coefficients that surround the source and create a cylinder that is rimmed or inserted in a tube made of material that is transparent to radiation.

As a variation, the rod that contains the source is separated into segments made of an opaque material spaced by connection bars with different attenuation coefficients.

The characteristics and advantages of the invention will appear when reading the description that follows of a concrete and non restrictive example while referring to the attached drawings where:

BRIEF DESCRIPTION OF THE FIGURES

FIG. 1 represents a general view of the double head open stand camera fitted with a TAC device on each detector, of which one is in working position and the other is in resting position;

FIG. 2 is a motorization example of the carriage that supports the TAC device during the sweeping;

FIG. 3 illustrates the TAC device located in its seating;

FIG. 4 is a simplified representation of a longitudinal section of the cassette;

FIG. 5 is a transversal section of the cassette;

FIG. 6 is a sectional view of the mounting of the cassette on its support;

FIG. 7 is a longitudinal section of a motorization example of the rotation of the rod that contains the source and its automatic recall into the closed position;

FIG. 8 is a transversal section of this motorization during operation;

FIG. 9 is transversal section of this motorization at rest; and

FIGS. 10a and 10b illustrate two examples of performance of the rod that contains the source.

DETAILED DESCRIPTION OF THE INVENTION

In FIG. 1, the gamma camera consists of a frame (1) that supports a revolving base (2) that holds the carriages (3) (4) respectively fitted with two detector (7) (8) supports (5) (6) whose detection surfaces are referenced (9)(10).

The base (2) rotates around the axis X'2X2;

The carriages (3) and (4) move linearly following the directions OY1 OY2;

The detector supports respectively rotate around the axes X2 X'2 and X3 X'3;

The detectors respectively rotate around the axes Y3 Y'3 and Y4 Y'4.

Thus, we see that inside a certain space, the detectors can take on any position and in particular be perpendicular as in the figure or parallel facing each other, etc.

A first TAC device (11) consistent with the invention is contained in a box (12) integral with the detector (7) and sends its radiation on the detection surface (10) of the detector (8) while a second TAC device (13) represented in folded position, would work, if it were open, on the surface (9) of detector (7).

The TAC device (11) moves following the axis X4X'4 so that the gamma rays emitted sweep the entire detector (8) surface (10).

FIG. 2 illustrates the casing (12) in which are attached a guide ramp (14) and a rack (15); a carriage (16) can slide on the ramp (14) while a motor reducer (17) driving a pinion (18) engages on the rack (15); the carriage (16) has an articulation axis (19) as a support (20) for a cassette (21). This support is held in place perpendicular to the movement line thanks to a compression spring (22) that, advantageously, can be a gas spring hinged between the axes (23) and (24). Path end electrical contacts and mechanical stops that are not represented limit the path of the carriage.

FIG. 3 shows the cassette (21) placed in its casing and held in place by the spring (22) which, during the rotation of the support (20), is first compressed until it passes a straight line that joins the axes (23) and (19) and then uncoiled until it reaches the position represented by pushing on the axis (23).

FIGS. 4 and 5 represent a cassette (21) consisting of an envelope (25) in a light material such as an aluminum blend or a plastic material enclosing a chamber (27) made of lead or any other radio opaque material; this chamber (27) consists on the one hand of a cylindrical casing (28) in which a rod (29), also cylindrical, containing a radioactive source (30) can be rotated, and on the other hand of a casing with a rectangular section (31) containing a collimator (32) that communicates with a cylindrical casing (28) through a channel (33) and with the outside by means of the channel (34). The collimator (32) consists of alternating blades (36) made of radio opaque material and struts (36) in a transparent material such as PVC.

The cylindrical rod (29) can have various arrangements to hold the radioactive source (30) but, in FIG. 5, we have a rod made of an isolating material such as tungsten in which a straight groove (37) for the placement of the source (30) is used, this source is held in place by one or several snap rings (38). When the rod (29) is in the position referred to as closed, as represented in FIG. 5, the source is perfectly isolated from the rod (29) and the lead of the chamber (27) by the tungsten; as the rod is tight in its seating, no radiation leaks can occur. On the other hand, when the rod (29) is rotated a half turn in order to place it in the position called open, the source (30) is in front of the channel (33) and emits its radiation through the collimator (32) and the channel (34). We must note that this channel (34) can hold a shutter made of a transparent material to prevent the introduction of dust. Putting the rod (29) in the open position by rotating it must be done with great care so that the window transmission can only take place through the channel (34) when the camera is operational with its TAC device.

FIG. 6 shows a device that ensures that the cassette, outside of its seating, is inevitably in the closed position and can only be opened when it is in place on its support. With this view in mind, and as a non-restrictive example, the extremity of the revolving rod (29) in a bearing (39) holds a circular groove (40) and at least two longitudinal grooves (41) (41'). A concentric sleeve (42) drawn back by a spring (43) is integral with at least two dowels (44) (44') that penetrate in the grooves (41) (41') of the rod (29) and in the grooves (141) (141') of a barrel (46). These dowels can only be reached through the holes (45)(45') made in the barrel (46). In neutral position, the rod (29) is therefore immobilized in rotation in relation to the barrel (46). On the opposite side, the support (20) of the cassette has an equal number of dowels (48) (48') that, once the cassette is inserted, enter in the holes (45)(45') and push the dowels (44)(44') that then penetrate in the circular groove (40) of the rod (29) allowing for it to rotate. This rod (29), in its extension, holds, in addition, a dowel (49) that acts as a key in a keyhole and prevents the removal of the cassette when it is not in the closed position.

FIGS. 7, 8 and 9 represent the rotation motorization of the rod (29) whose extremity has a sliding coupling system such as, for example, two flats sections (51) that penetrate a clevis mounting (52) integral with a pinion (53); this set rotates in a bearing (54) and a torsion spring (55) always brings the pinion back to the isolation position of the rod (29). The pinion (53) can mesh on a second pinion (56) integral with a motor reducer (57). With this end in view, this set is mounted on a lever (58) articulated in (59). This lever makes it possible to bring the pinion (56) closer to the pinion (53) when pushing on its extremity (60) contrary to a retraction spring (61); maintaining the meshing position can be done by means of an electromagnet (62) which attracts and holds to it one side (63) of the lever (58).

It operates as follows: in neutral position, the rod is in the closed position, held by the spring (55); when the TAC device is to be used, the computer that controls the scintographic system authorizes its opening by energizing the electromagnet (62). The operator can then push down on the button (60) until the side (63) sticks to the electromagnet (62), this ensures the meshing of the two pinions (56) and (53). The computer then drives the motor reducer (57), which results in the opening of the rod, then of the motor reducer (17) which causes the sweeping motion of the TAC device. If there is a power failure during the operation, the electromagnet (62) would let go of the lever (58), the pinion (53) would be released and the spring (55) would bring the rod (53) back into the closed position. During normal operation, when the operation is finished, the motor reducer (57) brings the rod back into the closed position and it is only then that the electromagnet (62) releases the lever (58) which is called back into the separated position by its spring (61).

FIGS. 10a and 10b represent two examples of rod (29) use whereas in FIG. 5, the simplest rod was represented, it is however possible to create a rod that is fitted with attenuators. The object of these attenuators is to compensate for the loss of energy from the source in time by making it equal to its minimum acceptable level using successive decreasing attenuations. With this end in view, the rod is divided into sectors that can be placed in front of the radiation output hole; each sector has its own function: closure, attenuator 1, attenuator 2, etc. For example, it is possible to make sectors (64) (FIG. 10a) in an opaque material, (65) in a material slightly transparent and (67) in a material that has no attenuation. Another option, in FIG. 10b, comes from the same principle but the rod is divided into segments (68) (69) (70) made of opaque material and spaced by rectangular section blades (7) that are completely transparent. Naturally, the use of a rod of one of these types or a similar type, requires that the rotation be performed by quarter turns; this can easily be done either by appropriately placing path end contacts, or by the help of an encoder mounted on the pinion (53).

The TAC device as set forth in the invention that has been described allows in particular for a greater security of handling of the radioactive source.

What is claimed is:

1. Transmission attenuation correction device for a scintigraphic camera comprising: a carriage movable in translation, this carriage is fitted with an articulation for a support that can be folded in a box or unfolded perpendicularly, wherein the device holds a removable cassette that contains a radioactive source;

wherein the camera is a gamma camera of the open stand dual detector type having a plurality of detectors, each detector facing another detector when the device is unfolded.

2. Device as set forth in claim 1 wherein in the cassette, the radioactive source is inserted in a longitudinal groove of a cylindrical rod made of a gamma rays isolating material; by rotating the rod, this groove can be placed either in front of an isolating wall or in front of an output channel for the radiation.

3. Device as set forth in claim 2, wherein the rotation of the rod is controlled by a motorized mechanism that consists of a driving pinion integral with a motor and a driven pinion linked to the rod by a sliding unit, and further wherein the two pinions are held separated by a first spring, and still further wherein the meshing, caused by a manual impulse on a push-rod, is maintained by an electromagnet device so that, in the absence of power, the pinions are separated.

4. Device as set forth in claim 2 wherein the rod is pulled back in an isolation position of the source by a second spring.

5. Device as set forth in claim 2, wherein, when the cassette is mounted on its support, a mechanical system, inserted in additional longitudinal grooves of the rod and of a cassette barrel, that immobilizes the rod in an isolation position is activated by pushing away said mechanical system in a circular groove to enable the rotation of said rod.

6. Device as set forth in claim 2 wherein the extremity of the rod has the shape of a key that can only enter or exit a support hole if said rod is in an isolation position in the cassette.

7. Device as set forth in claim 2 wherein the rod comprises sectors that surround the radioactive source, with different attenuation coefficients and that create a cylinder rimmed or inserted in a tube of material that is radio transparent.

8. Device as set forth in claim 2 wherein the rod contains a radioactive source and is divided into segments made of opaque material spaced by blades that have different attenuation coefficients.

9. The device set forth in claim 1 together with a main housing for integrally containing the box and an a respective detector thereby allowing the device and its respective detector to undergo linked movement along a plurality of axes.

10. The device set forth in claim 1 wherein the unfolded device is perpendicularly positioned relative to its facing detector.

11. The device set forth in claims 1 wherein, when the cassette of the device is folded back into the box, the principal axis of the cassette lays parallel to an edge of the detector with which it is housed.

12. The device set forth in claim 1 wherein, when the cassette is deployed to an operational position, the radioactive source is displaced in a scanning motion along a path adjacent an edge of the detector with which it is housed.

* * * * *